US011176938B2

(12) United States Patent
Du et al.

(10) Patent No.: US 11,176,938 B2
(45) Date of Patent: Nov. 16, 2021

(54) METHOD, DEVICE AND STORAGE MEDIUM FOR CONTROLLING GAME EXECUTION USING VOICE INTELLIGENT INTERACTIVE SYSTEM

(71) Applicant: Baidu Online Network Technology (Beijing) Co., Ltd., Beijing (CN)

(72) Inventors: Binyuan Du, Beijing (CN); Yan Zhang, Beijing (CN); Peng Yuan, Beijing (CN); Longlong Tian, Beijing (CN); Liangyu Chang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 183 days.

(21) Appl. No.: 16/511,414

(22) Filed: Jul. 15, 2019

(65) Prior Publication Data
US 2019/0341047 A1   Nov. 7, 2019

(30) Foreign Application Priority Data

Sep. 10, 2018  (CN) .......................... 201811053135.9

(51) Int. Cl.
G10L 15/22 (2006.01)
G10L 15/18 (2013.01)
G10L 15/30 (2013.01)

(52) U.S. Cl.
CPC .......... *G10L 15/22* (2013.01); *G10L 15/1815* (2013.01); *G10L 15/1822* (2013.01); *G10L 15/30* (2013.01); *G10L 2015/223* (2013.01)

(58) Field of Classification Search
CPC ........ G10L 15/22–15/228; G10L 15/30; G10L 15/18–15/187

(Continued)

(56) References Cited

U.S. PATENT DOCUMENTS 5,884,249 A    3/1999 Namba et al.
8,346,562 B2 * 1/2013 Lin .......................... G10L 15/22
                                                     704/275

(Continued)

FOREIGN PATENT DOCUMENTS

CN  101477532 A   7/2009
CN  101599270 A  12/2009

(Continued)

OTHER PUBLICATIONS

Notice of Allowance of corresponding Chinese application No. 201811053135.9 dated May 14, 2021, four pages.

*Primary Examiner* — Abul K Azad
(74) *Attorney, Agent, or Firm* — Harness, Dickey & Pierce, P.L.C.

(57) ABSTRACT

Embodiments provide a voice interaction method, a device, and a storage medium. The method includes: transmitting obtained audio data of a user to a server for semantic understanding, to obtain structured data; receiving the structured data returned by the server; and controlling, according to a running game and the structured data, the game to perform a corresponding operation. In the embodiments, voice recognition and semantic understanding technologies are used to enable a user to complete an operation of a game under a dialogue interaction through a communication between a terminal device and a server, thus enhancing game experience of the user and improving entertainment and convenience.

12 Claims, 7 Drawing Sheets

(58) Field of Classification Search
USPC .......................................................... 704/275
See application file for complete search history.

(56) References Cited

U.S. PATENT DOCUMENTS

| | | | |
|---|---|---|---|
| 8,433,709 | B2 | 4/2013 | Child |
| 9,093,077 | B2 | 7/2015 | Otani et al. |
| 10,127,908 | B1 * | 11/2018 | Deller ..................... G10L 15/26 |
| 2006/0053014 | A1 | 3/2006 | Yoshizawa |
| 2008/0171588 | A1 * | 7/2008 | Atashband ............ G07F 17/323 463/20 |
| 2009/0150553 | A1 | 6/2009 | Collart et al. |
| 2012/0030712 | A1 * | 2/2012 | Chang ................ H04N 21/4828 725/52 |
| 2015/0058781 | A1 * | 2/2015 | Malik ................... G06F 3/0488 715/772 |
| 2017/0142201 | A1 * | 5/2017 | Holmes ................. A63F 13/215 |
| 2018/0096283 | A1 | 4/2018 | Wang et al. |
| 2019/0019512 | A1 * | 1/2019 | Taki ..................... G06F 3/0481 |

FOREIGN PATENT DOCUMENTS

| | | |
|---|---|---|
| CN | 102395013 A | 3/2012 |
| CN | 104050966 A | 9/2014 |
| CN | 105895090 A | 8/2016 |
| CN | 106057200 A | 10/2016 |
| CN | 106941000 A | 7/2017 |
| CN | 107115668 A | 9/2017 |
| CN | 108495160 A | 9/2018 |
| JP | H08263258 A | 10/1996 |
| JP | 2007241104 A | 9/2007 |
| JP | 2013068809 A | 4/2013 |
| WO | 2004047076 A1 | 6/2004 |
| WO | 2009070615 A1 | 6/2009 |
| WO | 2015098079 A1 | 7/2015 |

* cited by examiner

METHOD, DEVICE AND STORAGE MEDIUM FOR CONTROLLING GAME EXECUTION USING VOICE INTELLIGENT INTERACTIVE SYSTEM

CROSS-REFERENCE TO RELATED APPLICATIONS

This application claims priority to Chinese Patent Application No. 201811053135.9, filed on Sep. 10, 2018, entitled "VOICE INTERACTION METHOD, DEVICE AND STORAGE MEDIUM", which is incorporated herein by reference in its entirety.

FIELD OF THE PRESENT DISCLOSURE

Embodiments of the present disclosure relate to the field of voice interaction technology, and in particular, to a voice interaction method, a device, and a storage medium.

BACKGROUND

With the development of the times, clarity of pictures on a television has been greatly improved, and excellent resolution has given the television a considerable advantage in playing a video picture. The television is no longer simply used to watch a TV show, but has evolved into a platform for videos, entertainments, games and television programs.

In prior art, a television equipped with a Duer Operating System (DuerOS) is integrated with an intelligent interactive dialogue system, and a user can naturally interact with a smart television in a human language. At the same time, a television (TV) has a large screen, and is thus very suitable for game use.

However, currently in a TV scene, an experience of playing games through buttons on a remote controller is not good. Some games that are more suitable for a conversational interaction have poor game experience in the prior art, and are thus unable to well meet the entertainment and convenience requirements from users.

SUMMARY

Embodiments of the present disclosure provide a voice interaction method, a device, and a storage medium, which can solve the problems of poor interaction effect, poor user experience and poor convenience in the foregoing solution.

In a first aspect, an embodiment of the present disclosure provides a voice interaction method, including:
transmitting obtained audio data of a user to a server;
receiving structured data returned by the server, where the structured data is obtained by the server recognizing the audio data; and
controlling, according to a running game and the structured data, the game to perform a corresponding operation.

In a specific implementation, the method further includes:
establishing a connection between the game and a voice intelligent interactive system when the game is detected to be started, to complete a binding between the game and the voice intelligent interactive system.

Further, where the transmitting the obtained audio data of the user to the server includes:
transmitting the audio data to the server for semantic understanding through the voice intelligent interactive system.

In a specific implementation, the method further includes:
receiving the audio data input by the user and transmitted by an intelligent remote controller or an intelligent terminal device.

Further, before the transmitting the obtained audio data of the user to the server, the method further includes:
performing echo cancellation and/or noise reduction on the audio data to obtain processed audio data.

Further, where the controlling, according to the running game and the structured data, the game to perform the corresponding operation includes:
in the voice intelligent interactive system, determining an operation instruction corresponding to the structured data according to the running game and the structured data; and
controlling, according to the operation instruction, the game to perform the corresponding operation.

In a second aspect, an embodiment of the present disclosure provides a voice interaction method, including:
receiving audio data transmitted by a terminal device;
performing semantic understanding processing on the audio data to obtain structured data corresponding to the audio data; and
returning the structured data to the terminal device.

Further, where the performing the semantic understanding processing on the audio data to obtain the structured data corresponding to the audio data includes:
performing recognition processing on the audio data to obtain text information corresponding to the audio data;
performing natural language processing and semantic interpretation on the text information to obtain a parsed content; and
classifying the parsed content through model processing to obtain the structured data, where the structured data represents machine instruction information corresponding to a content that the user intends to express.

In a third aspect, an embodiment of the present disclosure provides a terminal device, including:
a transmitting module configured to transmit obtained audio data of a user to a server;
a receiving module configured to receive structured data returned by the server, where the structured data is obtained by the server recognizing the audio data; and
a processing module configured to control, according to a running game and the structured data, the game to perform a corresponding operation.

In a specific implementation, the processing module is further configured to:
establish a connection between the game and a voice intelligent interactive system when the game is detected to be started, to complete a binding between the game and the voice intelligent interactive system.

In a specific implementation manner, the transmitting module is specifically configured to:
transmitting the audio data to the server for semantic understanding through the voice intelligent interactive system.

In a specific implementation, the receiving module is further configured to:
receiving the audio data input by the user and transmitted by an intelligent remote controller or an intelligent terminal device.

In a specific implementation, the processing module is specifically configured to:
performing echo cancellation and/or noise reduction on the audio data to obtain processed audio data;

performing a feature extraction on the processed audio data to obtain an audio feature, and decoding the audio feature to obtain text information.

In a specific implementation, the processing module is specifically configured to:

in the voice intelligent interactive system, determine an operation instruction corresponding to the structured data according to the running game and the structured data; and control, according to the operation instruction, the running game to perform the corresponding operation.

In a fourth aspect, an embodiment of the present disclosure provides a server, including:

a receiving module configured to receive audio data transmitted by a terminal device;

a processing module configured to perform voice understanding processing on the audio data, to obtain structured data corresponding to the audio data; and a transmitting module configured to return the structured data to the terminal device.

In a specific implementation manner, the processing module is specifically configured to:

perform recognition processing on the audio data to obtain text information corresponding to the audio data;

perform natural language processing and semantic interpretation on the text information to obtain a parsed content; and classify the parsed content through model processing to obtain the structured data, where the structured data represents machine instruction information corresponding to a content that the user intends to express.

In a fifth aspect, an embodiment of the present disclosure provides a terminal device, including: a receiver, a transmitter, a processor, a memory and a computer program; where the memory stores a computer executable instruction; and the processor executes the computer executable instruction stored in the memory so that the at least one processor performs the voice interaction method according to the first aspect.

In a sixth aspect, an embodiment of the present disclosure provides a server, including: a receiver, a transmitter, a memory, a processor and a computer program; where the memory stores a computer executable instruction; and the processor executes the computer executable instruction stored in the memory so that the at least one processor performs the voice interaction method according to the second aspect.

In a seventh aspect, an embodiment of the present disclosure provides a computer readable storage medium, where the computer readable storage medium stores a computer executable instruction, and implements the voice interaction method as described in the first aspect when the computer executable instruction is executed by a processor.

In an eighth aspect, an embodiment of the present disclosure provides a computer readable storage medium, where the computer readable storage medium stores a computer executable instruction, and implements the voice interaction method as described in the second aspect when the computer executable instruction is executed by a processor.

The embodiments provide a voice interaction method, a device, and a storage medium. The method includes: transmitting obtained audio data of a user to a server for semantic understanding, to obtain structured data; receiving the structured data returned by the server; and controlling, according to a running game and the structured data, the game to perform a corresponding operation. In the embodiment voice recognition and semantic understanding technologies are used to enable a user to complete an operation of a game under a dialogue interaction through a communication between a terminal device and a server, thus enhancing game experience of the user and improving entertainment and convenience.

BRIEF DESCRIPTION OF DRAWINGS

In order to more clearly illustrate technical solutions in embodiments of the present disclosure or the prior art, the drawings to be used in the embodiments or the prior art description will be briefly described below. Obviously, the accompanying drawings in the following description are some embodiments of the present disclosure, and for those skilled in the art, other drawings can be obtained according to these drawings without any creative effort.

DESCRIPTION OF EMBODIMENTS

In order to make purposes, technical solutions and advantages of the embodiments of the present disclosure clearer, the technical solutions in the embodiments of the present disclosure will be clearly and completely described below in conjunction with the accompanying drawings of the embodiments of the present disclosure. It is apparent that the described embodiments are some embodiments of the present disclosure, and not all embodiments. All other embodiments obtained by those skilled in the art based on the embodiments of the present disclosure without creative efforts are within the scope of the present disclosure.

In the prior art, an example is taken where a television is equipped with a Duer Operating System (DuerOS), an intelligent interactive dialogue system is integrated therein, and a user can naturally interact with a smart TV in a human language. At the same time, a television (TV) has a large screen, and is thus very suitable for game use. However, currently in a TV scene, an experience of playing games through buttons on a remote controller is not good. Some games that are more suitable for a conversational interaction, for example, mahjong and landlord, have poor game experience in the prior art, and are thus unable to well meet the entertainment and convenience requirements from users.

In view of the above problems, the present disclosure provides a voice interaction method, a device and a storage medium. Combining a game with an intelligent interactive system of a smart TV enables recognition of the same game terminology expressed in different ways, thus greatly enhancing the game experience, and making the smart TV a platform for voice interactive games. This solution will be described in detail below with reference to several specific embodiments.

Figure 1:
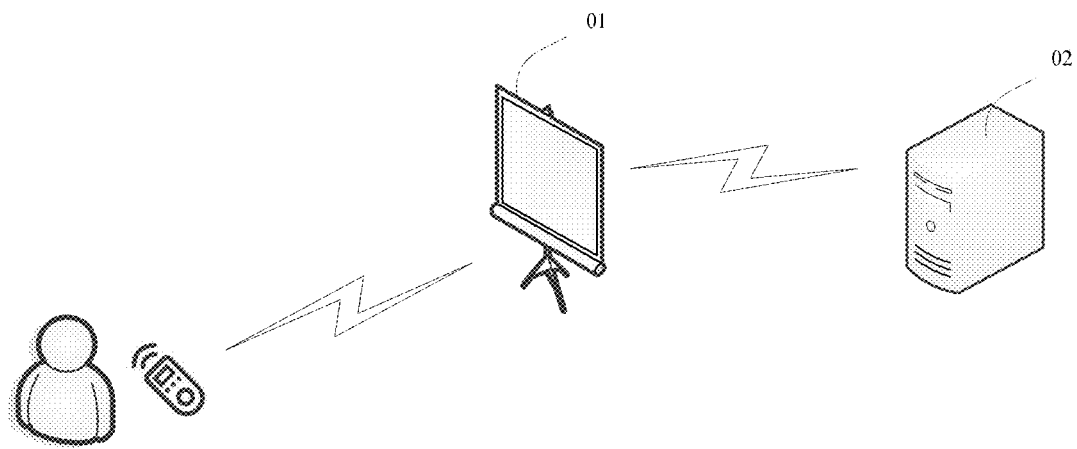
FIG. 1 is a schematic diagram of an application scenario of a voice interaction method according to an embodiment of the present disclosure.

FIG. 1 a schematic diagram of an application scenario of a voice interaction method according to an embodiment of the present disclosure. As shown in FIG. 1, a system provided in this embodiment includes a terminal device 01 and a server 02. The terminal device 01 can be a smart TV, a computer, a mobile phone, a tablet computer, and the like. The implementation manner of the terminal device 01 in this embodiment is not particularly limited, as long as the terminal device 01 can be connected to a network in a wired or wireless manner, and can perform data interaction. The server 02 is used to implement semantic understanding processing, and is a cloud platform for semantic understanding.

In a specific implementation, a user inputs audio data (i.e., voice) to the terminal device 01 through a voice remote controller, a voice collection device set on the terminal device 01, or other intelligent devices, the terminal device 01 can transmit the audio data to the server 02, and the server 02 performs voice understanding processing on the audio data to obtain corresponding structured data, and then transmits the structured data to the terminal device 01, and the terminal device 01 controls, according to the structured data, a running application or game to perform a corresponding operation.

In a specific implementation, the voice recognition process in the foregoing embodiment may also be completed by the terminal device 01. The specific steps are: the terminal device 01 obtains audio data, performs voice recognition on the audio data and converts the audio data into text information, performs voice understanding processing on the text information to obtain corresponding structured data, and controls an application or a game running on the terminal device 01 according to the structured data to perform a corresponding operation.

In a specific implementation, the terminal device 01 is equipped with a voice intelligent interactive system. The voice intelligent interactive system may be, for example, a Duer Operating System (DuerOS).

Figure 2:
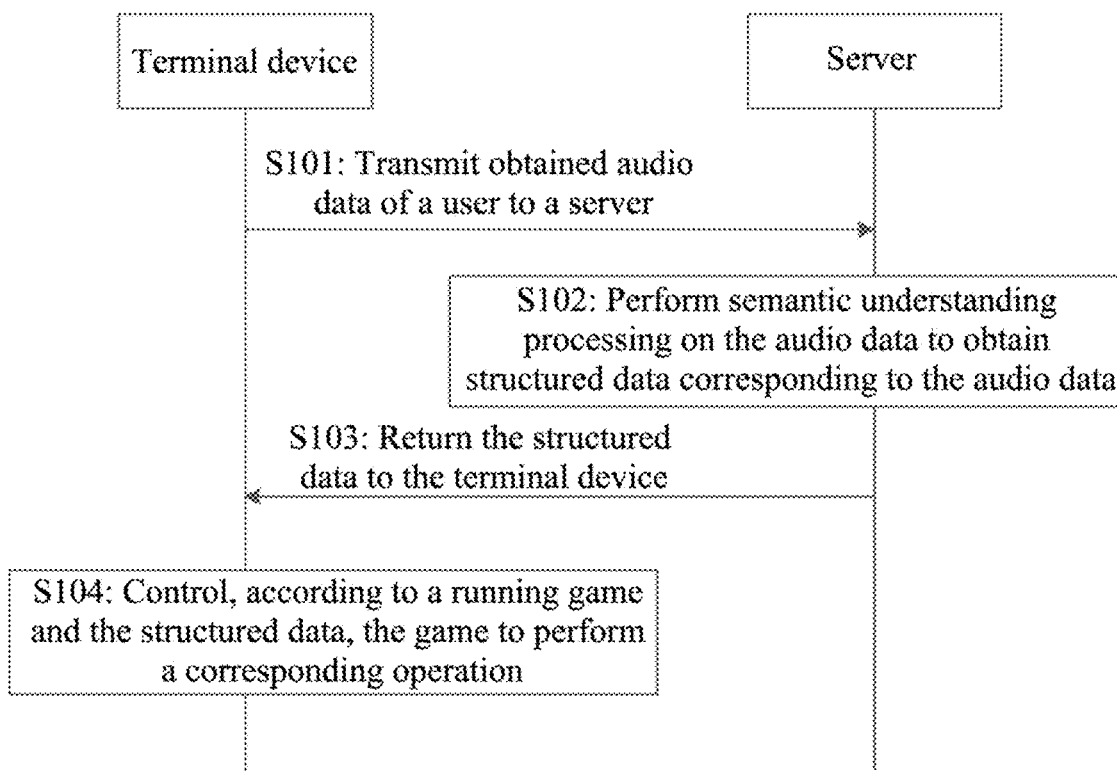
FIG. 2 is an interaction flowchart of Embodiment 1 of a voice interaction method according to an embodiment of the present disclosure.

FIG. 2 is an interaction flowchart of Embodiment 1 of a voice interaction method according to an embodiment of the present disclosure. As shown in FIG. 2, the solution is applied in the scenario shown in FIG. 1, and specific implementation steps of the voice interaction method are as follows:

S101: transmit obtained audio data of a user to a server.

In this step, the user can input the audio data to a terminal device through a voice collection device, and the voice collection device records the voice of the user into the audio data, and the terminal device transmits the obtained audio data to the server for semantic analysis and understanding. For the server, it receives the audio data transmitted by the terminal device, and then performs semantic analysis on the audio data so as to understand a control command that the user intends to express.

In a specific implementation of this solution, the voice collection device may be a voice collection device set on the terminal device, such as a microphone or the like; or other intelligent devices; when the terminal device is a smart TV, the voice collection device may also be a voice remote controller.

Optionally, in this step performing recognition processing on the audio data input by the user to obtain text information, and performing semantic understanding on the text information may also be executed by the terminal device, for example, the terminal device can also accurately recognize the intention of the user when the terminal device is offline.

S102: perform semantic understanding processing on the audio data to obtain structured data corresponding to the audio data.

In this step, after receiving the audio data transmitted by the terminal device, the server needs to perform semantic understanding on the audio data to determine an operational intention of the user. Since there are multiple user expressions for the same intention, there is a many-to-one relationship between the audio data input by the user and the operational intention, and the recognition result of the operational intention is embodied as the structured data in the server.

In order to obtain the structured data corresponding to the operational intention of the user, the server needs to analyze and process the audio data. The server can recognize the operational intention of the user according to a combination of features (such as a frequency, an amplitude and a tone color) of the voice in the audio data and the text information in the voice, and convert the operational intention into the structured data. The server can also directly convert the voice in the audio data into the text information, perform semantic understanding on the text information according to a keyword to obtain the operational intention of the user, and convert the operational intention into the structured data, which is not limited in the solution.

S103: return the structured data to the terminal device.

In this step, by analyzing the audio data transmitted by the terminal device, the server understands the content expressed by the user, that is, the structured data corresponding to the audio data is obtained, and then the structured data needs to be returned to the terminal device, so that the terminal device controls a voice intelligent interactive system and a game application to perform a corresponding operation. Therefore, the server needs to return the structured data to the terminal device, and the terminal device receives the structured data.

S104: control, according to a running game and the structured data, the game to perform a corresponding operation.

In this step, after receiving the structured data returned by the server, the terminal device needs to control the currently running game according to the structured instruction. Thus the terminal device determines a specific game to be controlled, and generates an operation instruction from the structured data according to the game, so as to control, according to the operation instruction, the currently running game to perform a corresponding operation.

In the implementation of this solution, there is a many-to-one mapping relationship between an expression of the user and the structured data, and after recognizing, parsing and classifying the content expressed by the user as described above, corresponding structured data is obtained, and an operation instruction is generated from the structured data and is executed in the game, in this way, the user can play the game in a voice interaction manner.

According to the voice interaction method provided in this embodiment, audio data input by a user is transmitted to a server for semantic understanding, and structured data returned by the server is received, and the game is controlled according to a running game and the structured data to perform a corresponding operation. In this embodiment voice recognition and semantic understanding technologies are used to enable a user to complete an operation of a game under a dialogue interaction through a communication between a terminal device and a server, thus enhancing game experience of the user and improving entertainment and convenience.

Figure 3:
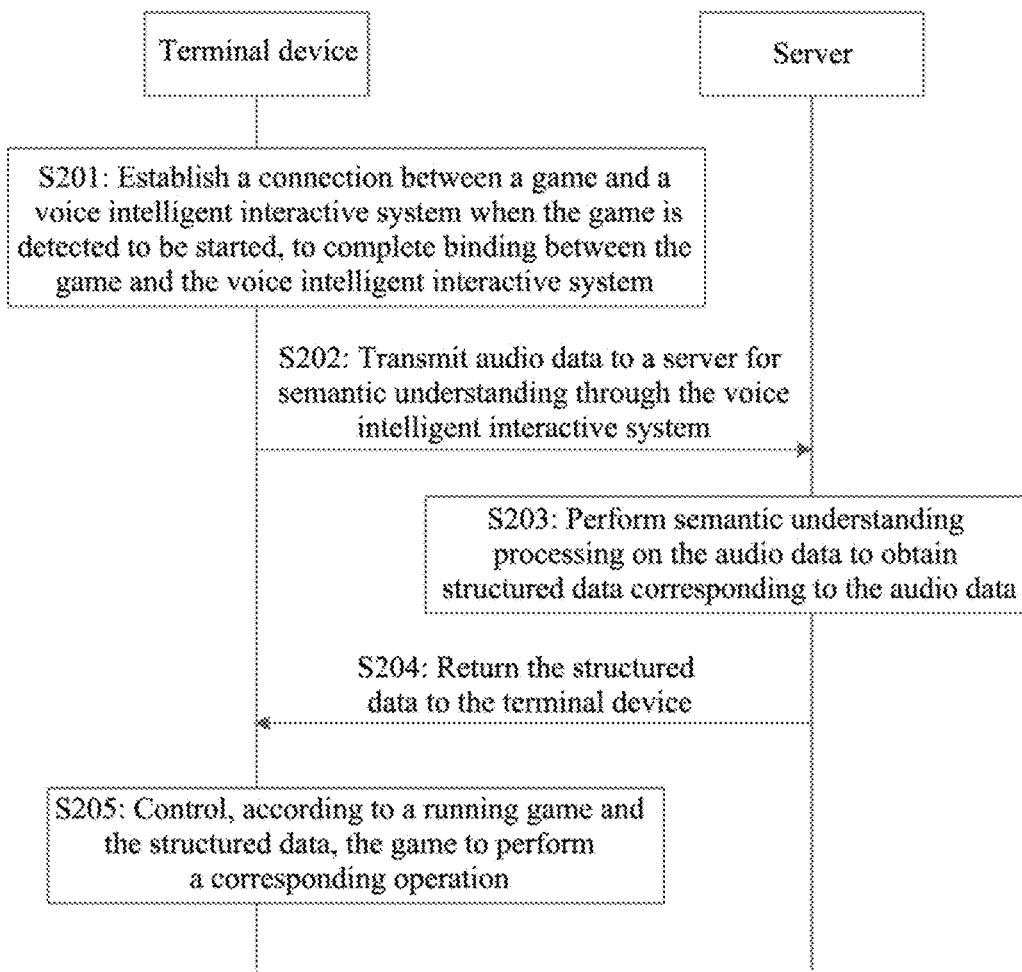
FIG. 3 is an interaction flowchart of Embodiment 2 of a voice interaction method according to an embodiment of the present disclosure.

FIG. 3 is an interaction flowchart of Embodiment 2 of a voice interaction method according to an embodiment of the present disclosure. As shown in FIG. 3, another specific implementation of the voice interaction method, on the basis of the above embodiment, includes the following steps:

S201: establish a connection between a game and a voice intelligent interactive system when the game is detected to be started, to complete binding between the game and the voice intelligent interactive system.

In this step, after the voice intelligent interactive system detects that a game is started, the voice intelligent interactive system establishes a connection with an application program of the game to perform binding, so that the voice intelligent interactive system can transmit an instruction to the application program of the game, and the application program of the game can return an execution result to the voice intelligent interactive system.

S202: transmit audio data to a server for semantic understanding through the voice intelligent interactive system.

In this step, the voice intelligent interactive system may perform echo cancellation and noise reduction or one of the two processes on the received audio data according to different application scenarios, and transmit the processed audio data to the server so that the semantic understanding completed by the server is more accurate.

Optionally, the above echo cancellation can be implemented by using an acoustic echo cancellation (AEC) algorithm, and the noise reduction of the audio data can be performed using a noise suppression (NS) algorithm, to eliminate environmental noise.

S203: perform semantic understanding processing on the audio data to obtain structured data corresponding to the audio data.

In this step, after receiving the audio data transmitted by a terminal device, the server needs to perform semantic understanding on the audio data to determine an operational intention of a user. Since there are multiple user expressions for the same intention, there is a many-to-one relationship between the audio data input by the user and the operational intention, and a recognition result of the operational intention is embodied as structured data in the server.

In order to obtain the structured data corresponding to the operational intention of the user, the server needs to analyze and process the audio data. The server can recognize the operational intention of the user according to a combination of features (such as frequency, amplitude and a tone color) of voice in the audio data and text information in the voice, and convert the operational intention into the structured data. The server can also directly convert the voice in the audio data into the text information, perform semantic understanding on the text information according to a keyword to obtain the operational intention of the user, and convert the operational intention into the structured data, which is not limited the solution.

S204: return the structured data to the terminal device.

In this step, by analyzing and processing the audio data transmitted by a terminal device, and the server understands the content expressed by the user, that is, the structured data corresponding to the audio data is obtained, and then the structured data needs to be returned to the terminal device, so that the terminal device controls a voice intelligent interactive system and a game application to perform a corresponding operation. Therefore, the server needs to return the structured data to the terminal device, and the terminal device receives the structured data.

S205: control, according to a running game and the structured data, the game to perform a corresponding operation.

In this step, after receiving the structured data returned by the server, the terminal device needs to control the currently running game according to the structured instruction. Thus the terminal device determines a specific game to be controlled, and generates an operation instruction from the structured data according to the game, so as to control, according to the operation instruction, the currently running game to perform a corresponding operation.

In the implementation of the embodiment, there is a many-to-one mapping relationship between a user expression and the structured data, and after recognizing, parsing and classifying the content expressed by the user as described above, corresponding structured data is obtained, and an operation instruction is generated from the structured data and is executed in the game, in this way, the user can play the game in a voice interaction manner.

Figure 4:
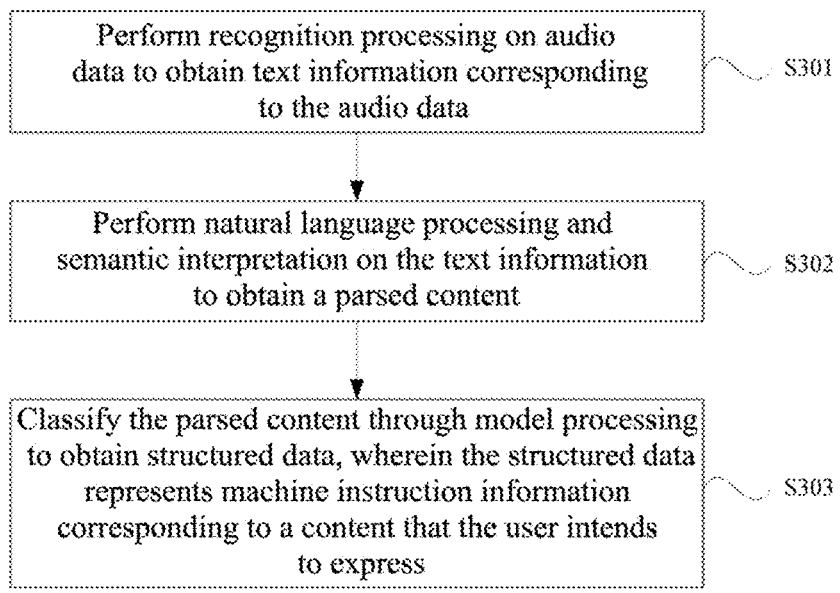
FIG. 4 is an interaction flowchart of Embodiment 3 of a voice interaction method according to an embodiment of the present disclosure.

FIG. 4 is an interaction flowchart of Embodiment 3 of a voice interaction method according to an embodiment of the present disclosure. As shown in FIG. 4, on the basis of any one of the foregoing embodiments, in an implementation process of the voice interaction method, the server needs to perform understanding processing on audio data to obtain corresponding structured data, and the process can be specifically implemented as the following steps:

S301: perform recognition processing on audio data to obtain text information corresponding to the audio data.

In this step, first, before performing voice recognition on the audio data, it is necessary to perform echo cancellation and noise reduction or one of two processes on the received audio data according to different application scenarios, and then perform voice recognition on processed audio data. The voice recognition process mainly includes extracting an audio feature in the audio data, and decoding the extracted audio feature to finally obtain corresponding text information.

S302: perform natural language processing and semantic interpretation on the text information to obtain a parsed content.

In this step, the text information converted from the audio data is subjected to information filtering, automatic abstracting, information extracting, text mining and other technical means, and a process of natural language processing is completed through a model, and then the text information is subjected to semantic interpretation to understand an operational intention of the user included in the text information, resulting in the parsed content with the operational intention of the user.

S303: classify the parsed content through model processing to obtain structured data, where the structured data represents machine instruction information corresponding to a content that the user intends to express.

In this step, a correspondence between the parsed content and the machine instruction information is established through a model, and the correspondence is generally a correspondence between a plurality of parsing contents having user operational intentions and machine instruction information. Thus, according to the model, the parsed contents are classified to obtain structured data, where the structured data represents the machine instruction information corresponding to the content that the user intends to express, and then the machine instruction information is returned to the terminal device, so that the terminal device can complete a corresponding instruction operation. This is also known as structured data return.

Figure 5:
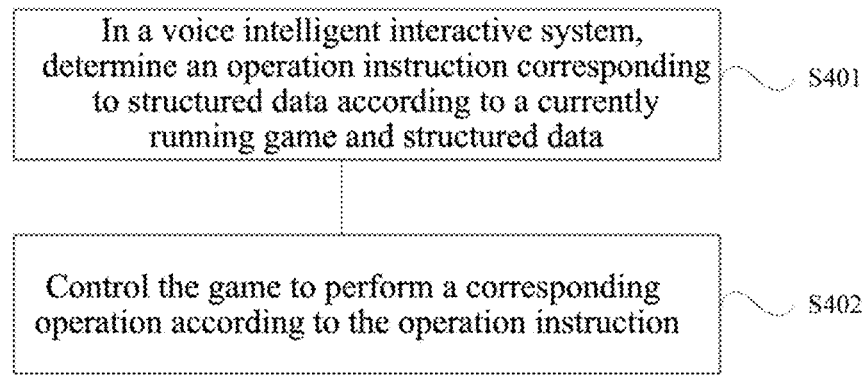
FIG. 5 is an interaction flowchart of Embodiment 4 of a voice interaction method according to an embodiment of the present disclosure.

FIG. 5 is an interaction flowchart of Embodiment 4 of a voice interaction method according to an embodiment of the present disclosure. As shown in FIG. 5, on the basis of any one of the foregoing embodiments, in an implementing process of the voice interaction method, a terminal device receives structured data returned by a server, and a process of controlling execution of the game according to the structured data can be specifically implemented as the following steps:

S401: in a voice intelligent interactive system, determine an operation instruction corresponding to structured data according to a currently running game and the structured data.

In this step, after the structured data is returned, the voice intelligent interactive system determines the operation instruction corresponding to the currently running game according to machine instruction information in the structured data, and the currently running game can be a game that binds with the voice intelligent interactive system when being started, or a running game detected by the voice intelligent interactive system after receiving the structured data return.

S402: control the game to perform a corresponding operation according to the operation instruction.

In this step, according to indication of the operation instruction, the game is controlled to perform the corresponding operation, and hence, the operational intention of the user can be realized.

On the basis of the above several embodiments, the voice interaction method is described below in detail with an example in which the terminal device is a television and the server is a cloud server (also called as a cloud, a cloud platform, etc.) that provides data analysis processing for the television.

Figure 6:
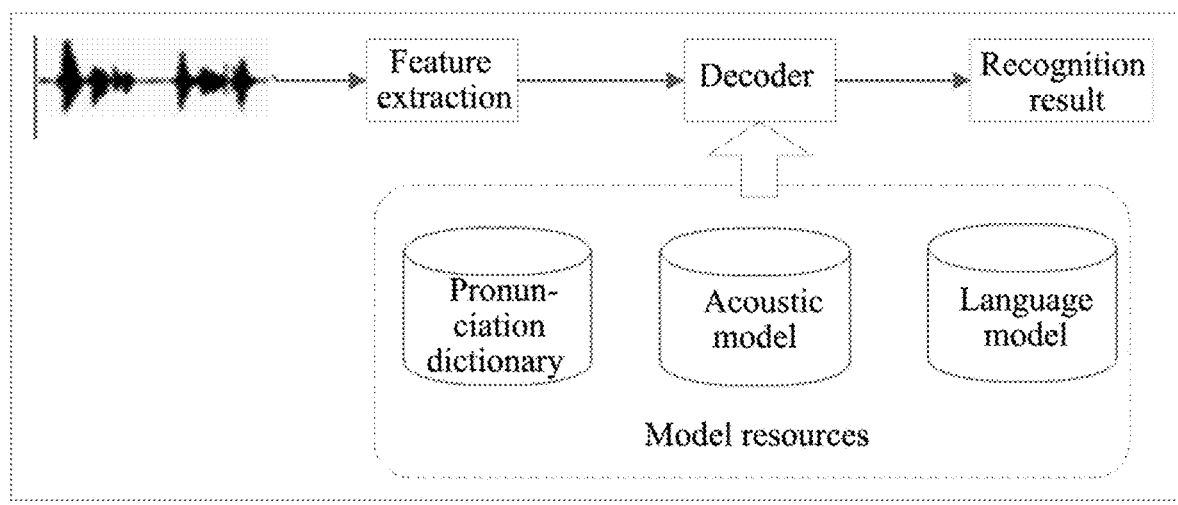
FIG. 6 is a flowchart of voice recognition according to an embodiment of the present disclosure.

FIG. 6 is a flowchart of voice recognition according to an embodiment of the present disclosure. As shown in FIG. 6, a process of the voice recognition includes: collecting audio data; performing a feature extraction on the collected audio data; and placing the collected audio feature on a specific decoder for decoding and obtaining a voice recognition result.

1. During collection of the audio data, a recording device with a higher performance, a shorter distance from a voice source to the device, and using an effective microphone array instead of a single microphone, will produce audio data with more complete features and easier to be recognized. For example, if a waken-up or recognition from a far field (>5 meters) is required, using a microphone array will show a much better performance than a single microphone.

2. A feature extraction is conducted for the collected audio data. First, the collected audio data cannot be directly used for recognition, it is necessary to perform echo cancellation and noise reduction or one of the two processes on the audio data according to a specific application scenario. For example, in the scenario of hands-free or conference application, the sound of a speaker will be fed back to a microphone for multiple times, and then there will be an acoustic echo in the audio data collected by the microphone, then an AEC algorithm is needed for the echo cancellation; for example, the audio data collected in a traveling vehicle will have a specific noise, and then a noise reduction algorithm needs to be performed on the audio data to eliminate the environment noise.

3. In a decoding process of the decoder, an acoustic model, a language model and a pronunciation dictionary are used, where a main function of the acoustic model is to convert the audio feature into a syllable, a main function of the language model is to convert the syllable into a text, and the pronunciation dictionary provides a mapping table from the syllable to the text.

Figure 7:
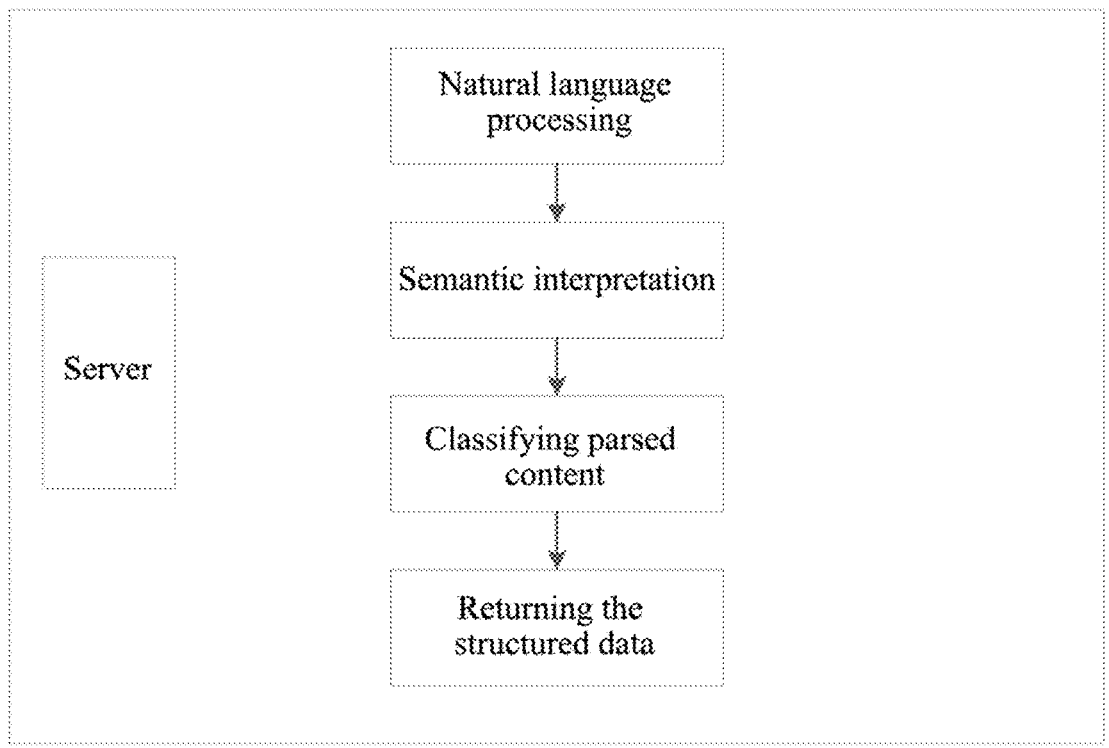
FIG. 7 is a flowchart of semantic understanding according to an embodiment of the present disclosure.

FIG. 7 is a flowchart of semantic understanding according to an embodiment of the present disclosure. As shown in FIG. 7, the semantic understanding includes: natural language processing, semantic parsing, parsed content classification, and structured data return.

After what is said by a user is converted into a text through voice recognition, the content expressed by the user needs to be processed. This processing is called as natural language processing. After the natural language processing, what is said by the user is parsed through semantic parsing to obtain a parsed content; then through a model processing, a cloud performs classification processing on the parsed content, and after the classification processing, an operational intention of the user can be matched with machine instruction information, and then the machine instruction information is returned to a television as structured data, and the television processes the structured data and performs a corresponding operation.

Figure 8:
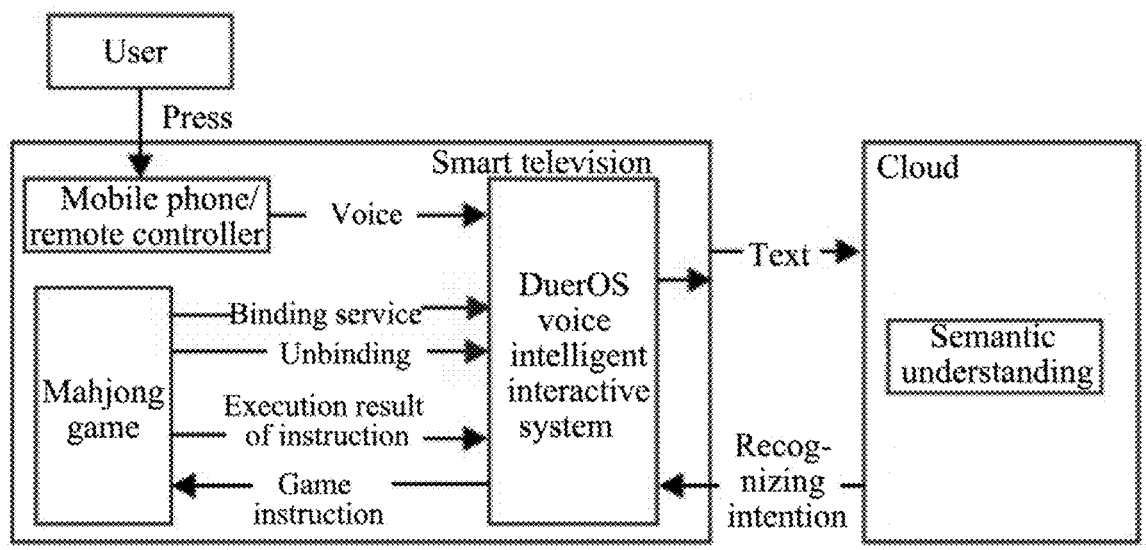
FIG. 8 is a first schematic diagram of Embodiment 5 of a voice interaction method according to an embodiment of the present disclosure.

FIG. 8 is a first schematic diagram of Embodiment 5 of a voice interaction method according to an embodiment of the present disclosure. As shown in FIG. 8, a mahjong game is taken as an example.

Here is an example of the mahjong game. When logging into the mahjong game, the game application first binds with a voice intelligent interactive system in a smart TV terminal; after receiving an instruction from a cloud, the smart TV terminal determines whether the instruction is a mahjong game instruction, and if so, the smart TV terminal transmits the game instruction to the mahjong game. The mahjong game will perform corresponding operations according to different instructions and return execution results to the voice intelligent interactive system. When exiting the mahjong game, the mahjong game application may disconnect from the intelligent interactive system, that is, unbind with the intelligent interactive system; or first perform an unbinding operation before exiting the game, and after the unbinding with the intelligent interactive system is completed, complete the exiting of the mahjong game.

Figure 9:
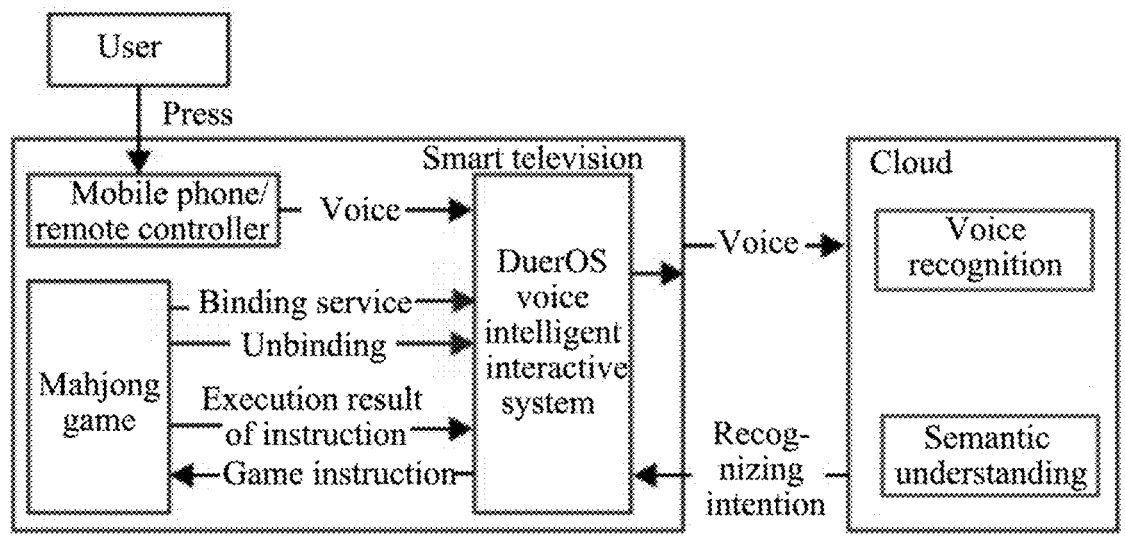
FIG. 9 is a second schematic diagram of Embodiment 5 of a voice interaction method according to an embodiment of the present disclosure.

In a specific implementation, the embodiment described in the foregoing solution may also be implemented by using the solution shown in FIG. 9. FIG. 9 is a second schematic diagram of Embodiment 5 of a voice interaction method according to an embodiment of the present disclosure.

The difference between the solutions shown in FIG. 9 and FIG. 8 is that the cloud can be used for voice recognition processing on the audio data. At this time, the voice intelligent interactive system can transfer the obtained audio data stream to the cloud, and the cloud performs voice recognition and semantic understanding on the audio data.

Figure 10:
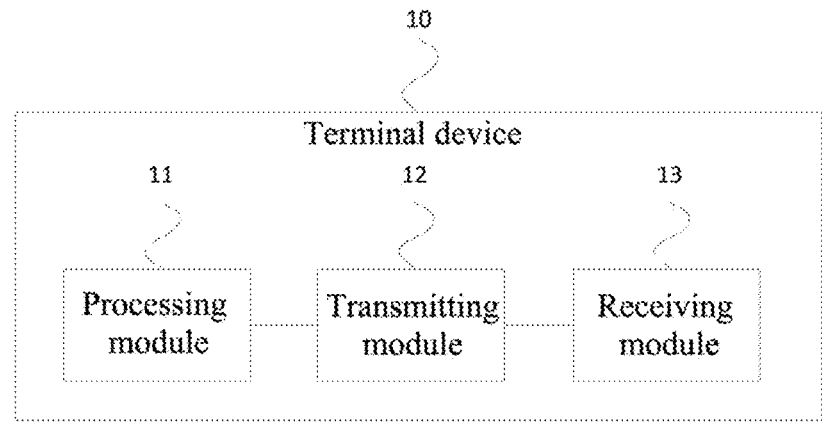
FIG. 10 is a structural schematic diagram of a terminal device according to an embodiment of the present disclosure.

FIG. 10 is a structural schematic diagram of a terminal device according to an embodiment of the present disclosure. As shown in FIG. 10, a terminal device 10 includes:

a transmitting module 12 configured to transmit obtained audio data of a user to a server;

a receiving module 13 configured to receive structured data returned by the server, where the structured data is obtained by the server recognizing the audio data; and a processing module 11 configured to control, according to a running game and the structured data, the game to perform a corresponding operation.

In a specific implementation, the processing module 11 is further configured to: establish a connection between the game and a voice intelligent interactive system when the game is detected to be started, to complete a binding between the game and the voice intelligent interactive system.

In a specific implementation, the transmitting module 12 is specifically configured to: transmit the audio data to the server for semantic understanding through the voice intelligent interactive system.

In a specific implementation, the receiving module 13 is further configured to: receive the audio data input by the user and transmitted by an intelligent remote controller or an intelligent terminal device.

In a specific implementation, the processing module 11 is specifically configured to: perform echo cancellation and/or noise reduction on the audio data to obtain processed audio data; and perform a feature extraction on the processed audio data to obtain an audio feature and decode the audio feature to obtain text information.

In a specific implementation, the processing module 11 is specifically configured to: in the voice intelligent interactive system, determine an operation instruction corresponding to the structured data according to the currently running game and the structured data; control, according to the operation instruction, the game to perform a corresponding operation.

The device provided in this embodiment may be used to implement technical solutions of embodiments of the foregoing methods applied to a terminal device, and has similar implementation principle and technical effects to the methods, and details are not repeated herein again.

Figure 11:
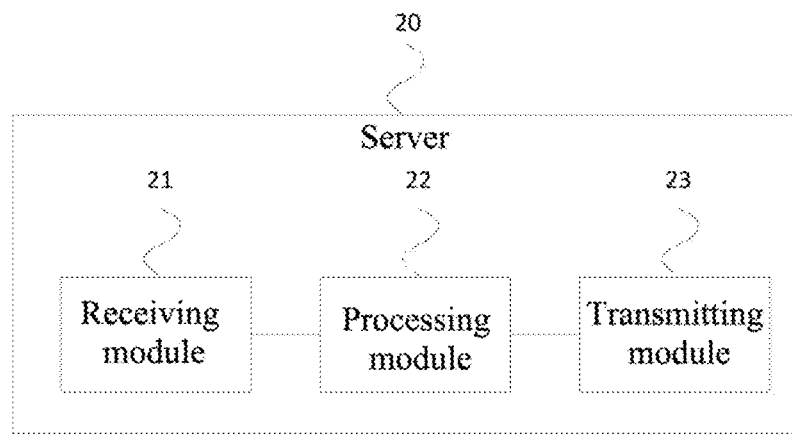
FIG. 11 is a structural schematic diagram of a server according to an embodiment of the present disclosure.

FIG. 11 is a structural schematic diagram of a server according to an embodiment of the present disclosure. As shown in FIG. 11, a server 20 includes:

a receiving module 21 configured to receive audio data transmitted by a terminal device;

a processing module 22 configured to perform semantic understanding on the audio data to obtain structured data corresponding to the audio data; and a transmitting module 23 configured to return the structured data to a terminal device.

In a specific implementation, the processing module 22 is specifically configured to: perform recognition processing on the audio data to obtain text information corresponding to the audio data; perform natural language processing and semantic interpretation on the text information to obtain a parsed content; and classify the parsed content through model processing, to obtain the structured data, where the structured data represents machine instruction information corresponding to a content that the user intends to express.

The device provided in this embodiment may be used to implement technical solutions of embodiments of the foregoing methods applied to a server, and has similar implementation principle and technical effect to the methods, and the details are not repeated herein again.

Figure 12:
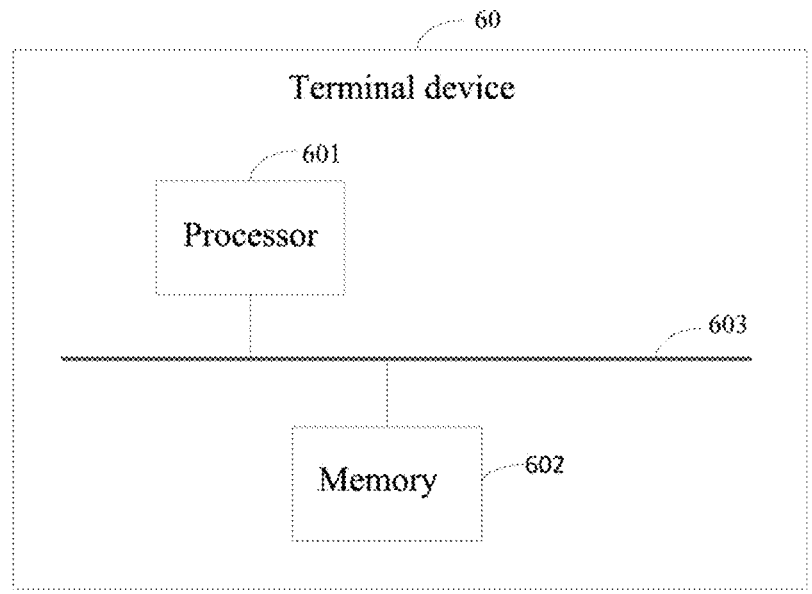
FIG. 12 is a hardware structural schematic diagram of a terminal device according to an embodiment of the present disclosure.

FIG. 12 is a hardware structural schematic diagram of a terminal device according to an embodiment of the present disclosure. As shown in FIG. 12, a terminal device 60 of this embodiment includes: a processor 601 and a memory 602; where the memory 602 is configured to store a computer executable instruction; and the processor 601 is configured to execute the computer executable instruction stored in the memory to implement the steps performed by the terminal device in the foregoing embodiments. Reference may be made to the related descriptions in the foregoing method embodiments for details.

Optionally, the memory 602 can be either standalone or integrated together with the processor 601.

When the memory 602 is independently set, the terminal device further includes a bus 603 for connecting the memory 602 and the processor 601.

Figure 13:
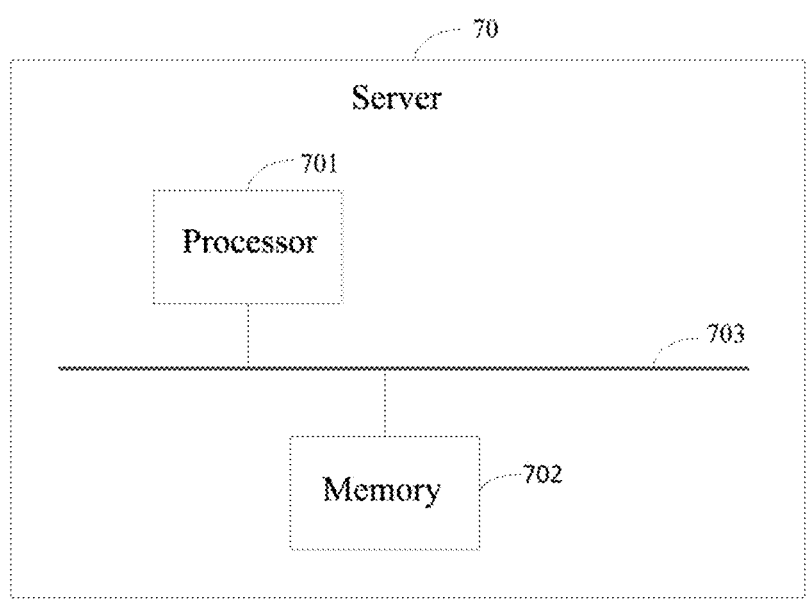
FIG. 13 is a hardware structural schematic diagram of a server according to an embodiment of the present disclosure.

FIG. 13 is a hardware structural schematic diagram of a server according to an embodiment of the present disclosure. As shown in FIG. 13, a server 70 of this embodiment includes: a processor 701 and a memory 702; where the memory 702 is configured to store a computer executable instruction;

the processor 701 is configured to execute the computer executable instruction stored in the memory to implement the steps performed by the server in the foregoing embodiments. Reference may be made to the related descriptions in the foregoing method embodiments for details.

Optionally, the memory 702 can be either standalone or integrated together with the processor 701.

When the memory 702 is independently set, the server further includes a bus 703 for connecting the memory 702 and the processor 701.

An embodiment of the present disclosure further provides a computer readable storage medium, where the computer readable storage medium stores a computer executable instruction, and implements the voice interaction method on a terminal device as described above when the computer executable instruction is executed by a processor.

An embodiment of the present disclosure further provides a computer readable storage medium, where the computer readable storage medium stores a computer executable instruction, and implements the voice interaction method on a server as described above when the computer executable instruction is executed by a processor.

In several embodiments provided by the present disclosure, it should be understood that the disclosed device and method may be implemented in other manners. For example, the device embodiments described above are only illustrative. For example, the division of the modules is only a division of logical functions, and in actual implementation, there may be other division manners, for example, multiple modules may be combined with or integrated into another system, or some features can be ignored or not executed. In addition, the coupling or direct coupling or communication connection between each other, as shown or discussed, may be an indirect coupling or communication connection through some interfaces, devices or modules, and may be in electrical, mechanical or other manners.

The modules described as separate components may or may not be physically separated, and the components displayed as modules may or may not be physical units, that is, they may be located in one place, or may be distributed to multiple network units. Some or all of the modules may be selected according to actual needs to achieve the purpose of the solutions of the embodiments.

In addition, each functional module in each embodiment of the present disclosure may be integrated into one processing unit, or each module may exist physically separately, or two or more modules may be integrated into one unit. The unit(s) in the module can be implemented in the form of hardware or in the form of hardware plus software functional unit.

The above-described integrated modules implemented in the form of software function module can be stored in a computer readable storage medium. The software function module is stored in a storage medium, and includes a plurality of instructions for making a computer device (which may be a personal computer, a server, or a network device, etc.) or a processor to perform some steps of the methods of the embodiments of the present application.

It should be understood that the foregoing processor may be a central processing unit (CPU), or may be other general-purpose processor, digital signal processor (DSP), application specific integrated circuit (ASIC), etc. The general-purpose processor may be a microprocessor or any conventional processor, or the like. The steps of the methods disclosed in the present disclosure may be directly embodied as being executed by a hardware processor or by a combination of hardware and software modules in a processor.

The memory may include a high speed RAM memory, or may include an non-volatile memory NVM, such as at least one disk memory, and may also be a USB flash drive, a removable hard disk, a read only memory, a magnetic disk, or an optical disk.

The bus may be an industry standard architecture (ISA) bus, a peripheral component interconnection (PCI) bus, or an extended industry standard architecture (EISA) bus, etc. The bus can be divided into an address bus, a data bus, a control bus, and the like. For ease of representation, the bus in the drawings of the present application is not limited to only one bus or one type of bus.

The above storage medium may be any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk or an optical disk. A storage medium may be any available medium that can be accessed by a general purpose or special purpose computer.

An exemplary storage medium is coupled to a processor to enable the processor to read information from, and write information to, the storage medium. Of course, the storage medium can also be part of the processor. The processor and the storage medium may be located in an application specific integrated circuits (ASIC). Of course, the processor and the storage medium may also exist as discrete components in an electronic device or a master control device.

Those skilled in the art will appreciate that all or part of the steps to implement the various method embodiments described above may be accomplished by a program instruction related hardware. The aforementioned program can be stored in a computer readable storage medium. The program, when being executed, performs the steps included in the foregoing method embodiments; and the foregoing storage medium includes media that can store a program code, such as a ROM, a RAM, a magnetic disk or an optical disk.

Finally, it should be noted that the above embodiments are merely illustrative of the technical solutions of the present disclosure, and are not intended to be limiting; although the present disclosure has been described in detail with reference to the foregoing embodiments, those skilled in the art will understand that the technical solutions described in the foregoing embodiments may be modified, or some or all of the technical features therein may be equivalently replaced; and these modifications or replacements will not make the essence of corresponding technical solutions deviate from the scope of the technical solutions of the embodiments of the present disclosure.

What is claimed is:

1. A voice interaction method, comprising:
   establishing a connection between a game and a voice intelligent interactive system when the game is detected to be started, to complete a binding between the game and the voice intelligent interactive system;
   transmitting obtained audio data of a user to a server;
   receiving structured data returned by the server, wherein the structured data is obtained by the server through performing recognition processing on the audio data to obtain text information corresponding to the audio data, performing natural language processing and semantic interpretation on the text information to obtain a parsed content, and classifying the parsed content through model processing, wherein the structured data represents machine instruction information corresponding to a content that the user intends to express, and wherein the natural language processing comprises information filtering, automatic abstracting, information extracting, and text mining;
   determining an operation instruction corresponding to the structured data according to the currently running game and the structured data in the voice intelligent interactive system; and
   controlling, according to the operation instruction, the currently running game to perform the corresponding operation.

2. The method according to claim 1, wherein the transmitting the obtained audio data of the user to the server comprises:
   transmitting the audio data to the server for semantic understanding through the voice intelligent interactive system.

3. The method according to claim 1, further comprising:
   receiving the audio data input by the user and transmitted by an intelligent remote controller or an intelligent terminal device.

4. The method according to claim 1, wherein before the transmitting the obtained audio data of the user to the server, the method further comprises:
   performing echo cancellation and/or noise reduction on the audio data to obtain processed audio data.

5. A terminal device, comprising: a receiver, a transmitter, at least one processor, a memory and a computer program; wherein
   the memory stores a computer executable instruction; and
   the at least one processor executes the computer executable instruction stored in the memory so that the at least one processor performs the voice interaction method according to claim 1.

6. A non-transitory computer readable storage medium, wherein the non-transitory computer readable storage medium stores a computer executable instruction, and implements the voice interaction method according to claim 1 when the computer executable instruction is executed by a processor.

7. The method according to claim 1, wherein the voice intelligent interactive system is a Duer Operating System (DuerOS) and the game is mahjong game.

8. A terminal device, comprising: a processor and a computer-readable medium for storing program codes, which, when executed by the processor, cause the processor to:

establish a connection between a game and a voice intelligent interactive system when the game is detected to be started, to complete a binding between the game and the voice intelligent interactive system;

transmit obtained audio data of a user to a server;

receive structured data returned by the server, wherein the structured data is obtained by the server through performing recognition processing on the audio data to obtain text information corresponding to the audio data, performing natural language processing and semantic interpretation on the text information to obtain a parsed content, and classifying the parsed content through model processing, wherein the structured data represents machine instruction information corresponding to a content that the user intends to express, and wherein the natural language processing comprises information filtering, automatic abstracting, information extracting, and text mining;

determine an operation instruction corresponding to the structured data according to the currently running game and the structured data in the voice intelligent interactive system; and control, according to the operation instruction, the currently running game to perform the corresponding operation.

9. The device according to claim 8, wherein the program codes further cause the processor to:

transmit the audio data to the server for semantic understanding through the voice intelligent interactive system.

10. The device according to claim 8, wherein the program codes further cause the processor to:

receive the audio data input by the user and transmitted by an intelligent remote controller or an intelligent terminal device.

11. The device according to claim 8, wherein the program codes further cause the processor to:

perform echo cancellation and/or noise reduction on the audio data to obtain processed audio data.

12. A server, comprising: a processor and a computer-readable medium for storing program codes, which, when executed by the processor, cause the processor to:

receive audio data transmitted by a terminal device;

perform recognition processing on the audio data to obtain text information corresponding to the audio data;

perform natural language processing and semantic interpretation on the text information to obtain a parsed content;

classify the parsed content through model processing to obtain structured data, wherein the structured data represents machine instruction information corresponding to a content that the user intends to express, and wherein the natural language processing comprises information filtering, automatic abstracting, information extracting, and text mining; and return the structured data to the terminal device for enabling the terminal device to determine an operation instruction corresponding to the structured data according to a currently running game and the structured data in a voice intelligent interactive system, and control, according to the operation instruction, the currently running game to perform the corresponding operation, wherein the voice intelligent interactive system has been established a connection with the game when the game is detected to be started to complete a binding between the game and the voice intelligent interactive system.

* * * * *